United States Patent [19]

Fiedler

[11] 4,124,010
[45] Nov. 7, 1978

[54] PISTON PIN BORE AND METHOD OF FINISHING

[75] Inventor: David F. Fiedler, Richmond, Ind.

[73] Assignee: Dana Corporation, Toledo, Ohio

[21] Appl. No.: 752,221

[22] Filed: Dec. 20, 1976

[51] Int. Cl.² .............................................. F02F 3/00
[52] U.S. Cl. ............................................... 123/193 P
[58] Field of Search .......... 123/193 R, 193 CP, 193 P

[56] References Cited

U.S. PATENT DOCUMENTS 2,845,917 8/1958 Laubender ....................... 123/193 P

FOREIGN PATENT DOCUMENTS 2,152,462 4/1973 Fed. Rep. of Germany ....... 123/193 P
929,081 12/1947 France .................................. 123/193 P
22,561 of 1912 United Kingdom ................. 123/193 P Primary Examiner—Charles J. Myhre
Assistant Examiner—Craig R. Feinberg
Attorney, Agent, or Firm—Robert M. Leonardi

[57] ABSTRACT

A piston comprises a piston pin bore adapted to at least partially contain a piston pin. The bore is finished by a roll burnishing process which substantially simultaneously prestresses, smooths and distorts the bore into a predetermined hourglass configuration.

4 Claims, 3 Drawing Figures

PISTON PIN BORE AND METHOD OF FINISHING

BACKGROUND OF THE INVENTION

This invention relates generally to pistons for use in reciprocating internal combustion engines and more particularly to the piston pin bores of such pistons.

Conventional pistons for use in internal combustion engines, such as high speed diesel engines, generally comprise a crown or head portion which acts as a reaction surface for the combustion in the corresponding cylinder of the engine. Depending from and cast integrally with the head portion of the piston is a skirt for guiding the piston in its reciprocating movement within the cylinder. A pair of bosses also depend from the piston head and are cast integrally with the head and skirt portions. A generally cylindrical piston pin bore extends through each boss, with the two bores being coaxial. Each bore receives an end of a piston pin. A connecting rod is journalled at one of its ends about the piston pin and at its other end to a crankshaft.

In the operation of a typical reciprocating engine, driving forces such as are exerted by expanding gas within the combustion chamber of the engine are transmitted from the piston head through the piston pin bosses to the piston pin. The forces are then transmitted to the connecting rod and then to the driveshaft.

Problems such as piston pin bore cracking can often arise because of the high stress concentration on the piston pin bosses. This cracking can occur because the piston pin has a tendency to flex and flatten as the driving force is carried through it. The pin can thereby become axially disaligned with respect to the piston pin bores, thereby causing a great portion of the driving force to be localized at the inner (i.e., adjacent the connecting rod) and upper (i.e., adjacent the piston head) portions of the bores. The recurrent concentration of forces can cause an overstressing of the boss material surrounding the piston pin bore which may lead to a fatigue failure in the form of cracking.

The aforementioned problems can occur more often when the piston pin bore is not smoothed and prestressed. Roll burnishing has previously been used as a finishing step to smooth the surface and to eliminate some surface defects in the piston pin bore. In heretofore known processes for smoothing by roll burnishing the diameter of the bore is enlarged by a maximum amount of 0.0005 inches and essentially no prestressing or densification of material occurs. When roll burnishing for purposes of smoothing, the generally cylindrical shape of the bore is maintained and no further rounding or reboring is required. However, because this process does not significantly densify or prestress the material around the bore, the probability of cracking under some operating conditions can remain relatively high.

Roll burnishing has also been used to densify or prestress the material around the piston pin bores. Heretofore when a roll burnishing process has been used for densification, the depth of densification of material has been a minimum of about 0.020 inches. In this process, the diameter of the bore is enlarged about 0.004 inches or more.

A problem encountered with the roll burnishing densification process is distortion of the piston pin bore. The end portions of the bore have a tendency to increase in diameter more readily than the center portions. This problem becomes more prominent if the piston is of a material having a high porosity, such as cast aluminum. Distortion occurs during the roll burnishing process when the material surrounding the bore is squeezed or compressed, causing material at the edges of the bore to flow axially. The distortion occuring as a result of the heretofore employed roll burnishing process for densification has left the bore in a relatively exaggerated and presently unacceptable hourglass shape. A reaming or reboring process is then required as a finishing step.

The reaming or reboring process again places the bore into its original cylindrical shape. Because the roll burnishing process densifies the material to a relatively great depth (0.020 inches or greater), much of the densified material is removed in the reaming process while an acceptable thickness of over about 0.010 inches of prestressed material still remains. However, the reboring is an additional step in the piston manufacturing process that was heretofore necessary when roll burnishing for densification was utilized.

SUMMARY

It is an object of the present invention to provide a piston having an improved piston pin bore configuration.

It is a further object of the present invention to provide an improved method of finishing a piston pin bore.

These and other objects of the present invention which will become apparent from the following detailed description are achieved by finishing the piston pin bore by roll burnishing, such that the bore is prestressed, smoothed and distorted a predetermined amount. The resulting piston pin bore has a generally hourglass configuration.

DETAILED DESCRIPTION OF A PRESENTLY PREFERRED EMBODIMENT

Figure 1:
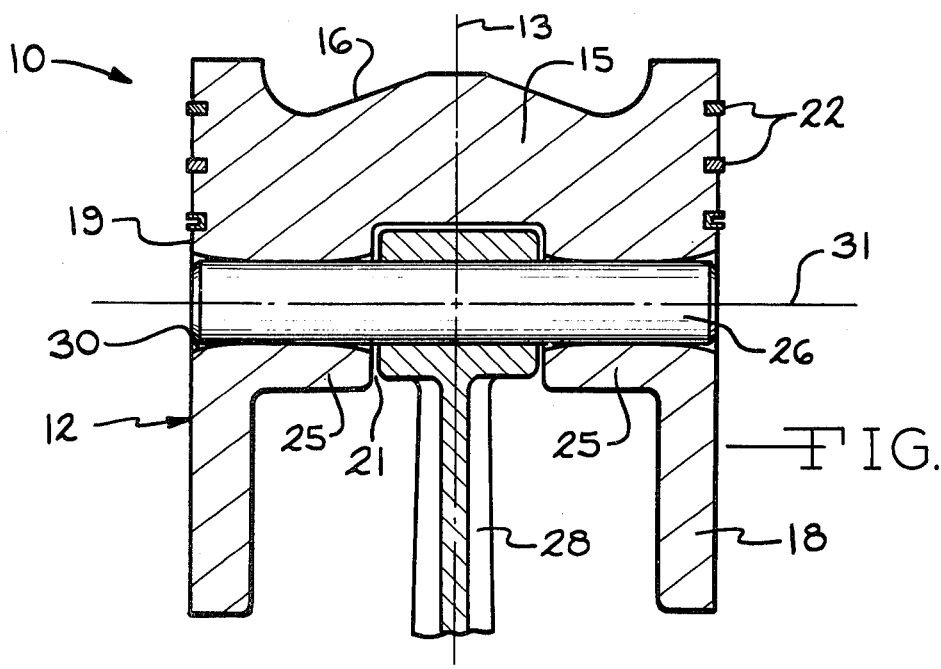
FIG. 1 is a cross sectional view of a piston having a piston pin bore of the present invention.

Referring to FIG. 1, a piston assembly 10 for a relatively high speed reciprocating diesel engine includes a generally cylindrical cast aluminum piston 12. The piston 12 has a longitudinal axis 13 about which the piston is generally symmetrical. The piston 12 comprises a crown or head portion 15 having a contoured reaction surface 16. The surface 16 is generally normal to the longitudinal axis 13.

A cylindrical piston skirt 18 is cast integrally with and depends from the piston head 15. The skirt prevents excessive rocking of the piston and tends to limit "piston slap" against the walls of the cylinder (not shown). The piston has a hollowed center region 21 beneath the piston head 15 and within the skirt 18 for receiving a connecting rod as will hereinafter be discussed. The outer peripheral surface 19 of the piston is provided with a plurality of annular grooves 21 (see FIG. 2) each of which is adapted to receive a piston ring 22 for providing sliding contact with the engine cylinder under operating conditions.

A pair of diametrically opposed pin bosses 25 depend from the piston head 15 and are cast integrally with the head and the encircling skirt 18. Each boss 25 extends from the skirt a distance equal to about a third of the diameter of the piston.

A piston pin bore 30 is cast into each boss 25. The bores 30 are coaxial, having an axis 31 which intersects the longitudinal axis 13 of the piston at a right angle. After casting, each bore 30 is sized to within a predetermined tolerance by a conventional boring method. The procedure for finishing the bore surfaces will hereinafter be described in detail.

Each bore 30 is adapted to encirle and restrain an end of a piston pin 26. The piston pin 26 has a cylindrical shape and a diameter of adequate size for operative association with the pin bores 30. A connecting rod 28 is journalled at one end about the piston pin 26 at a location between the bosses 25. The opposite end of the rod 28 is journalled about a crankshaft (not shown) in a conventional manner.

Figure 2:
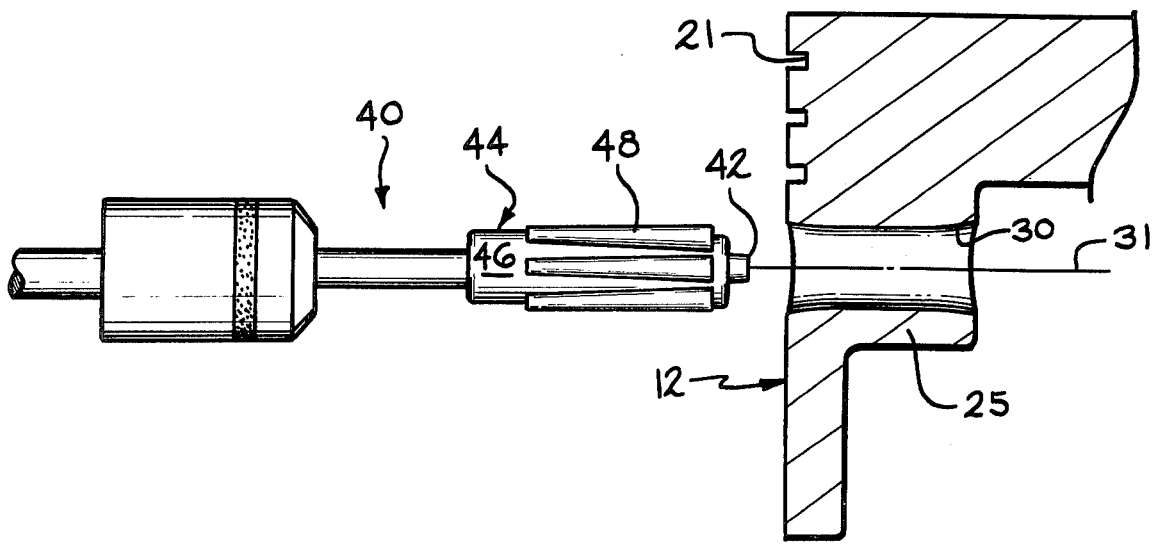
FIG. 2 is a cross sectional view of a portion of the piston of FIG. 1 illustrating the roll burnishing process of the present invention.

FIG. 2 illustrates a roll burnishing method for finishing the inner surface of the piston pin bores 30. A roll burnishing assembly 40 has a tapered mandrel tip 42 upon which is mounted a roller cage assembly 44. The assembly 44 includes a retaining cage 46 which contains a plurality of highly polished and hardened burnishing rollers 48. The rollers 48 have a taper corresponding to that of the mandrel tip 42.

The finishing step in preparing the piston pin bore 30 is accomplished by axially moving the collapsed assembly 40 into the bore. The assembly is then expanded to a predetermined size. Both the rate of rotation of the assembly and the dwell time within each bore are precisely predetermined to produce the desired effect.

Roll burnishing is a cold-working process. It compresses the grain structure of the material and smoothes the surface irregularities. The size of the roll burnishing assembly 40 is such that the rollers 48 develop within the bores 30 a pressure that exceeds the yield point of the piston material.

This roll burnishing process substantially simultaneously accomplishes a smoothing of the piston pin bore surface, a densification or prestressing of the material surrounding the piston pin bore and a predetermined, limited amount of distortion, especially near the ends of each bore.

The smoothing of the bore surface is achieved by flattening the peaks or surface irregularities of the bore by the rollers. This smoothness provides for a greater contact area between the bore and the piston pin, thereby reducing the load per unit area.

Densification of the material surrounding the bore occurs to a depth of about 0.001 inches at the center portions and 0.016 inches at the end portions. The depth of densification may vary from these dimensions depending upon the size and smoothness of the bore prior to roll burnishing, the porosity and modulus of elasticity of the material surrounding the bore, etc. Densification occurs because the grains of material around the bore are rolled out or elongated, thereby increasing the density of the material. This prestressing will enable the material to accept more stress or load per unit area without failure.

Figure 3:
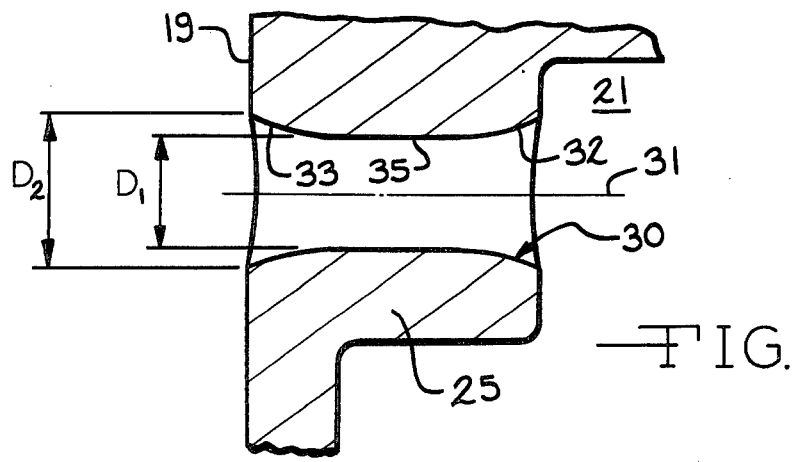
FIG. 3 is an enlarged cross sectional view of the piston pin bore of the piston of FIG. 1.

Distortion of the bore 30 as a result of the roll burnishing process can be more clearly seen in FIG. 3. The bore 30 has a first and second axially spaced end portions 32 and 33, respectively, and a center portion 35 between the end portions. Distortion of the bore 30 occurs because the material around the bore is less constrained at the end portions 32 and 33 than at the center portion 35. The material at the end portions 32 and 33 will therefore have a tendency to flow more readily. After completion of the burnishing process, each axially spaced cross section of the bore 30 will have a generally circular perimeter with the centers positioned on the axis 31 of the bore. The diameters of the end portions 32 and 33 denoted by $D_2$, will be approximately equal and will be from about 0.0004 to about 0.0008 inches larger than the diameter $D_1$ of the center portion 35, thereby giving the bore 30 a generally curved hourglass configuration.

The hourglass distortion of the piston pin bores 30 can be advantageous if the amount of distortion is carefully controlled and limited. The load placed upon the piston pin 26 during operation of the engine and the resulting pin flexure can be accurately determined. The optimum bore contour will approximate the contour of the piston pin under load, thereby providing for maximum piston pin to bore contact area. The load on the piston pin bores 30 can therefore be more uniformly distributed, with stress concentrations and the probability of pin bore cracking reduced accordingly. No additional boring or reaming of the bore 30 will be required after roll burnishing in this manner.

An example of the roll burnishing parameters is presented for a more thorough understanding of the process. A typical cast aluminum piston for use in a diesel engine and having a nominal diameter of 4.25 inches is designed to utilize a piston pin having a diameter of about 1.5005 inches. Prior to finishing, the piston pin bore is cylindrical and has a diameter of about 1.5000 ± 0.0002 inches and a surface smoothness of between about 80 and 120 microinches AA. With the roll burnishing assembly rotating at a rate corresponding to a linear speed of about 40 surface feet per minute (sfpm), a dwell time of about 15 seconds will be sufficient to give an acceptable contour to the bore. The speed of the burnishing assembly has been stated in terms of linear dimensions because the optimum rotational rate in revolutions per minute will change as the bore diameters and burnishing assembly sizes change. It should be noted that speeds of from about 30 to 50 sfpm may also be used depending upon the diameter of the bore and the degree of densification and/or distortion required for a particular application. After burnishing the bore will have a smoothness of about 6 to 10 microinches AA and a diameter at its center portion of about 1.5010 inches.

In operation of the engine the piston 12 will be forced downward (as viewed in FIG. 1) carrying along with it the piston pin 26 and connector rod 28. The resistance of the rod 28 to downward movement will impose an upward force to the piston pin 26. This force will tend to flex and flatten the pin 26. As the pin 26 distorts its contour at the upper (as viewed in FIG. 1) and inner (adjacent the hollowed area 21) region will closely approximate the contour of the pin bore 30 at that area. The result is a more uniform loading of the bore surface. Any flattening, flexing or other distortion of the pin 26 at other areas adjacent the pin bore end portions 32 and 33 can also be accommodated by the larger clearance.

Although the above detailed description has been given to illustrate a presently preferred embodiment, numerous modifications may be made without departing from the spirit and scope of this invention as set forth in the following claims.

What I claim is:

1. An aluminum piston comprising a piston head, a longitudinal axis, an outer peripheral surface, a hollowed center region for receiving a connecting rod, and a first piston pin bore extending through at least a portion of said piston in a direction transverse to said longitudinal axis and adapted to at least partially contain a piston pin, said piston pin adapted to be pivotally connected to said connecting rod, said bore comprising an outer end portion adjacent said outer peripheral surface, an inner end portion adjacent said hollowed center region and a center portion between said outer and inner end portions, each of said center and end portions having a generally circular cross-section, said bore being substantially smoothly curved going from said outer end portion to said inner end portion, the improvement wherein the diameters of each of said outer and inner end portions of said bore are substantially equal and are from about 0.0004 inches to about 0.0008 inches larger than the diameter of said center portion, whereby said bore has a smoothly curved hourglass configuration.

2. A piston as defined in claim 1 further comprising a second piston pin bore generally co-axial with said first bore, said second bore having an hourglass configuration and having one end adjacent said outer peripheral surface and another end adjacent said hollowed center region.

3. A piston as defined in claim 1 wherein the material surrounding and defining said bore has a surface smoothness of about 6 to 10 microinches AA.

4. A piston as defined in claim 1 wherein the material defining said bore is more dense to a depth of about 0.016 inches at each of said end portions and about 0.001 inches at said center portion than the material at other locations in said piston.

* * * * *